United States Patent
Stebnicki et al.

[11] Patent Number: 6,036,001
[45] Date of Patent: Mar. 14, 2000

[54] SIDE-FLEXING CONVEYOR CONSTRUCTION

[75] Inventors: James C. Stebnicki, Whitefish Bay; Robert E. Mitchell, Milwaukee, both of Wis.

[73] Assignee: Rexnord Corporation, Milwaukee, Wis.

[21] Appl. No.: 08/856,211

[22] Filed: May 14, 1997

[51] Int. Cl.[7] .................................................. B65G 17/06
[52] U.S. Cl. .......................................................... 198/852
[58] Field of Search ...................................... 198/851–853

[56] References Cited

U.S. PATENT DOCUMENTS

| | | | |
|---|---|---|---|
| 912,600 | 2/1909 | McPherson . | |
| 1,772,423 | 8/1930 | Hurxthal . | |
| 2,065,931 | 12/1936 | Alling | 198/189 |
| 3,186,535 | 6/1965 | Palmaer | 198/201 |
| 3,261,451 | 7/1966 | Roinestad | 198/193 |
| 3,641,831 | 2/1972 | Palmaer | 74/250 C |
| 3,730,331 | 5/1973 | Goldberg | 198/189 |
| 3,774,752 | 11/1973 | Harvey | 198/195 |
| 3,779,617 | 12/1973 | Palmaer | 305/38 |
| 3,826,150 | 7/1974 | Palmaer | 74/250 R |
| 3,854,575 | 12/1974 | Fraioli, Sr. | 198/182 |
| 3,870,141 | 3/1975 | Lapeyre et al. | 198/193 |
| 3,883,284 | 5/1975 | De Mets | 425/371 |
| 3,946,857 | 3/1976 | Fraioli, Sr. | 198/189 |
| 4,051,949 | 10/1977 | Lapeyre | 198/853 |
| 4,185,737 | 1/1980 | Blättermann | 198/831 |
| 4,213,527 | 7/1980 | Lapeyre et al. | 198/853 |
| 4,222,483 | 9/1980 | Wootton et al. | 198/831 |
| 4,276,980 | 7/1981 | Oizumi | 198/851 |
| 4,640,410 | 2/1987 | Palmaer et al. | 198/803.01 |
| 4,742,907 | 5/1988 | Palmaer | 198/831 |
| 4,765,454 | 8/1988 | Hodlewsky et al. | 198/635 |
| 4,821,872 | 4/1989 | Lapeyre | 198/853 |
| 4,846,339 | 7/1989 | Roinestad | 198/852 |
| 4,865,183 | 9/1989 | Hodlewsky et al. | 198/834 |
| 4,901,844 | 2/1990 | Palmaer et al. | 198/778 |
| 4,934,517 | 6/1990 | Lapeyre | 198/852 |
| 4,934,518 | 6/1990 | Lapeyre | 198/853 |
| 4,941,568 | 7/1990 | Lapeyre | 198/853 |
| 4,949,838 | 8/1990 | Lapeyre et al. | 198/853 |
| 4,993,544 | 2/1991 | Bailey et al. | 198/834 |
| 5,069,330 | 12/1991 | Palmaer et al. | 198/778 |
| 5,181,601 | 1/1993 | Palmaer et al. | 198/831 |
| 5,224,583 | 7/1993 | Palmaer et al. | 198/779 |
| 5,310,045 | 5/1994 | Palmaer et al. | 198/778 |
| 5,310,046 | 5/1994 | Palmaer et al. | 198/831 |
| 5,372,248 | 12/1994 | Horton | 198/852 |
| 5,775,480 | 7/1998 | Lapeyre et al. | 198/852 |

FOREIGN PATENT DOCUMENTS

| | | | |
|---|---|---|---|
| 1312301 | 5/1993 | Canada | 614/315 |
| 0427337 | 5/1991 | European Pat. Off. | B65G 21/18 |
| 2344975 | 9/1973 | Germany . | |
| 341086 A1 | 10/1985 | Germany . | |
| 981 758 | 1/1965 | United Kingdom . | |
| WO 92/06022 | 4/1992 | WIPO . | |

*Primary Examiner*—Joseph E. Valenza
*Attorney, Agent, or Firm*—Quarles & Brady LLP

[57] ABSTRACT

Disclosed herein is a conveyor intended for travel along an intended direction on a given path, having laterally spaced and opposed sides, and comprising a chain pin, a first link module including a first plurality of laterally spaced eyes which respectively have therein aligned first bores receiving the chain pin, and which define a series of spaces, and a second link module including a second plurality of laterally spaced eyes which respectively have therein aligned second bores receiving the chain pin to prevent disconnection of the first and second modules, and which are received in the spaces between the first plurality of eyes so as to engage the first plurality of eyes in such manner as to directly transmit tension in the direction of conveyor movement between the first and second link modules at laterally spaced multiple places between the conveyor sides.

47 Claims, 7 Drawing Sheets

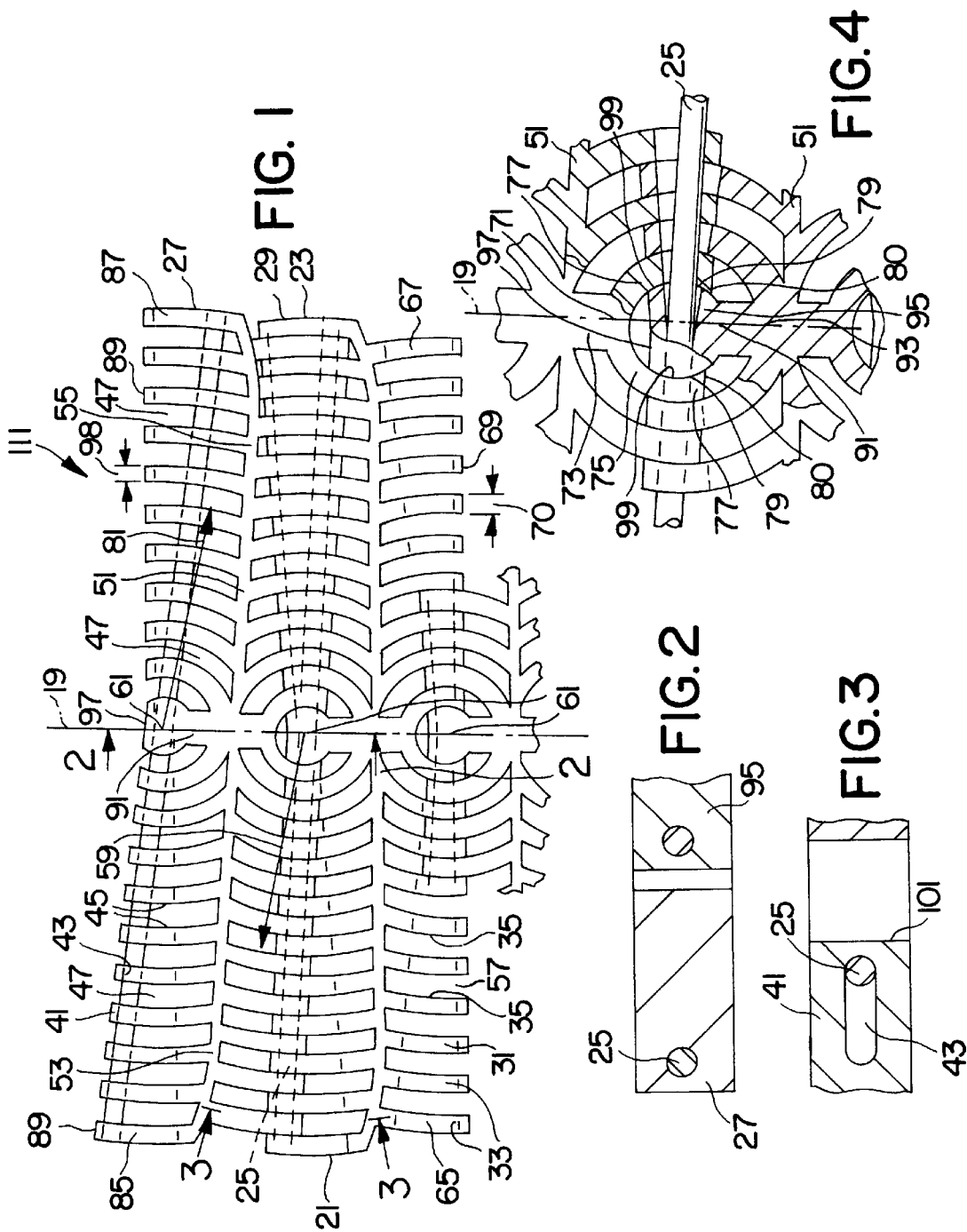

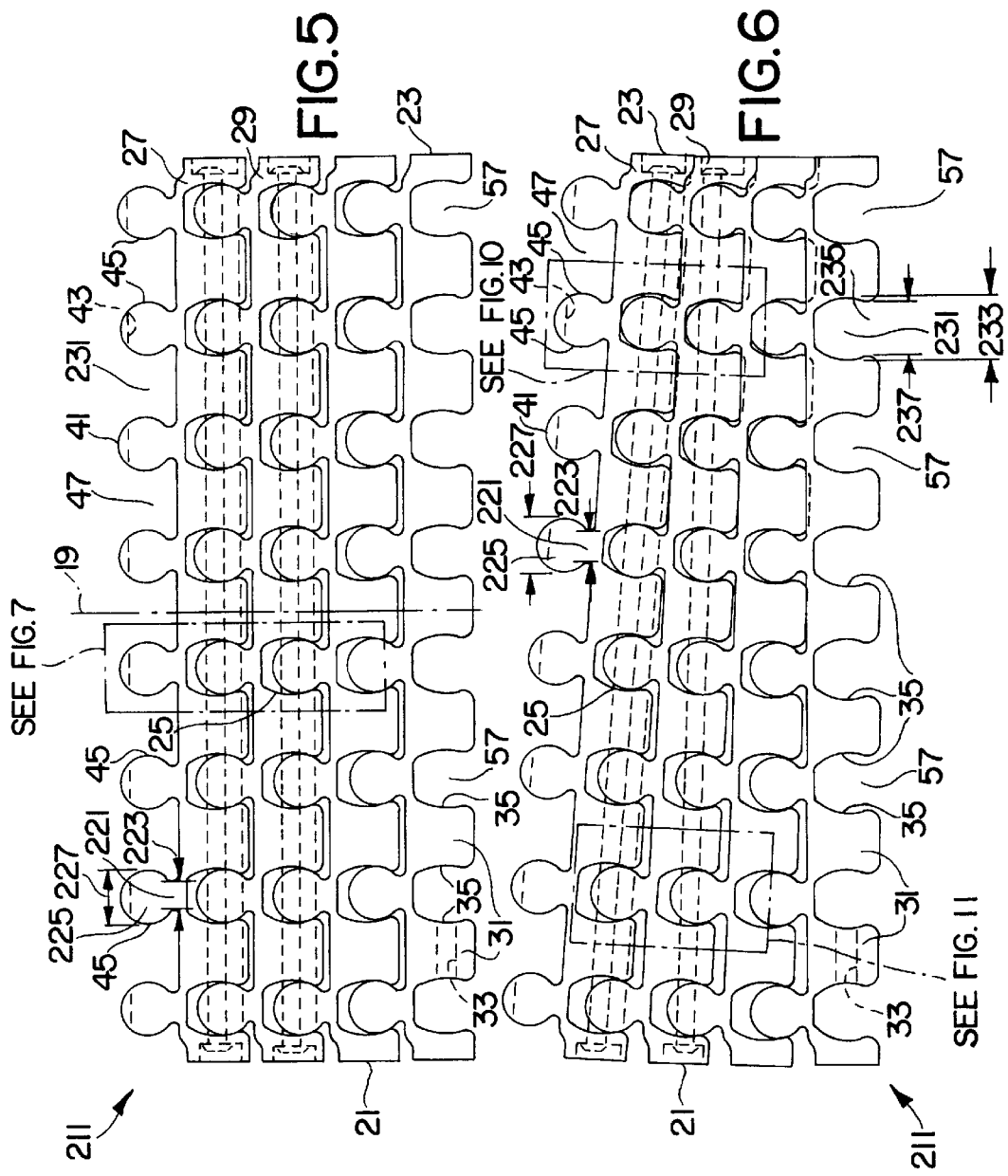

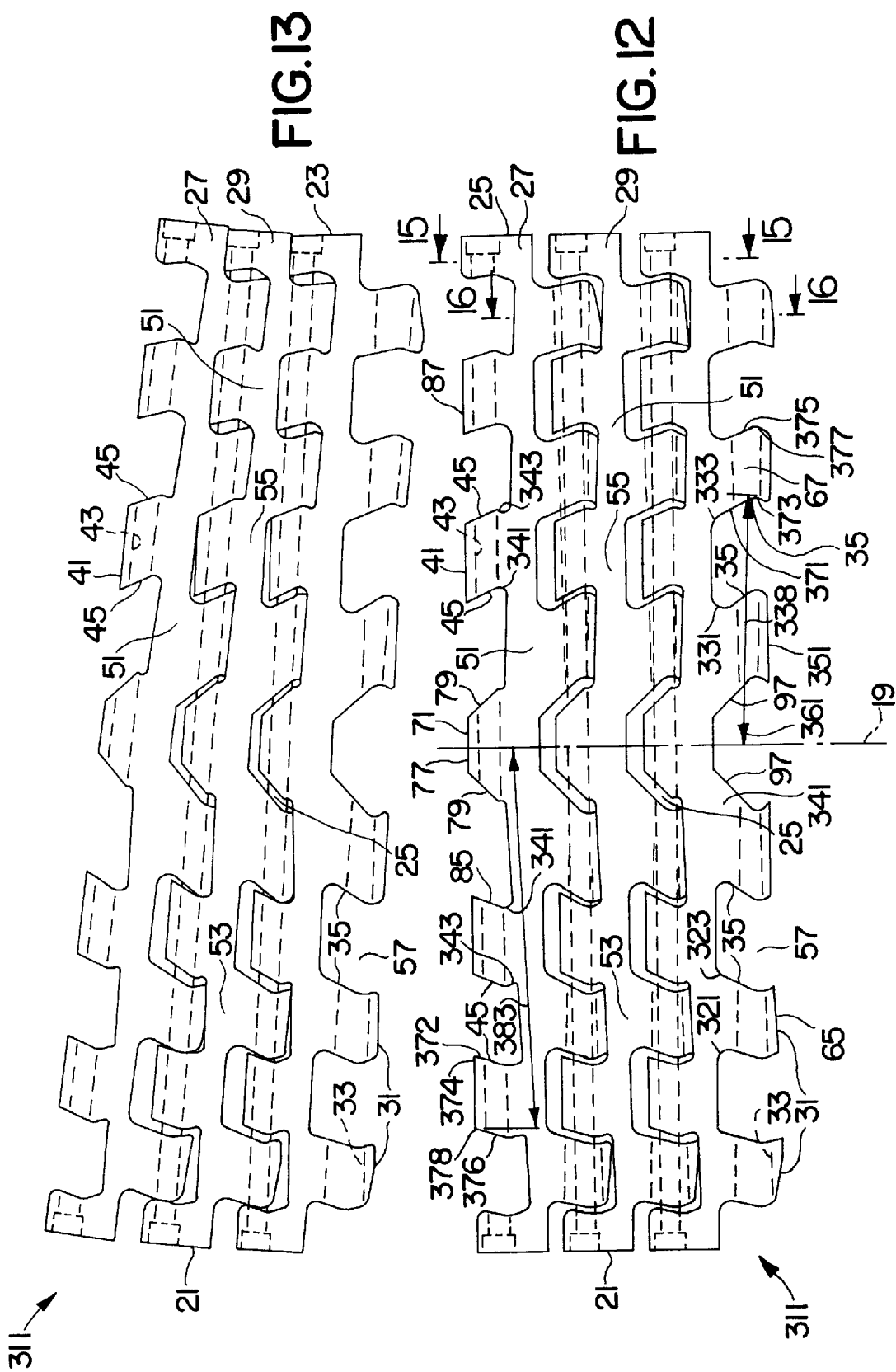

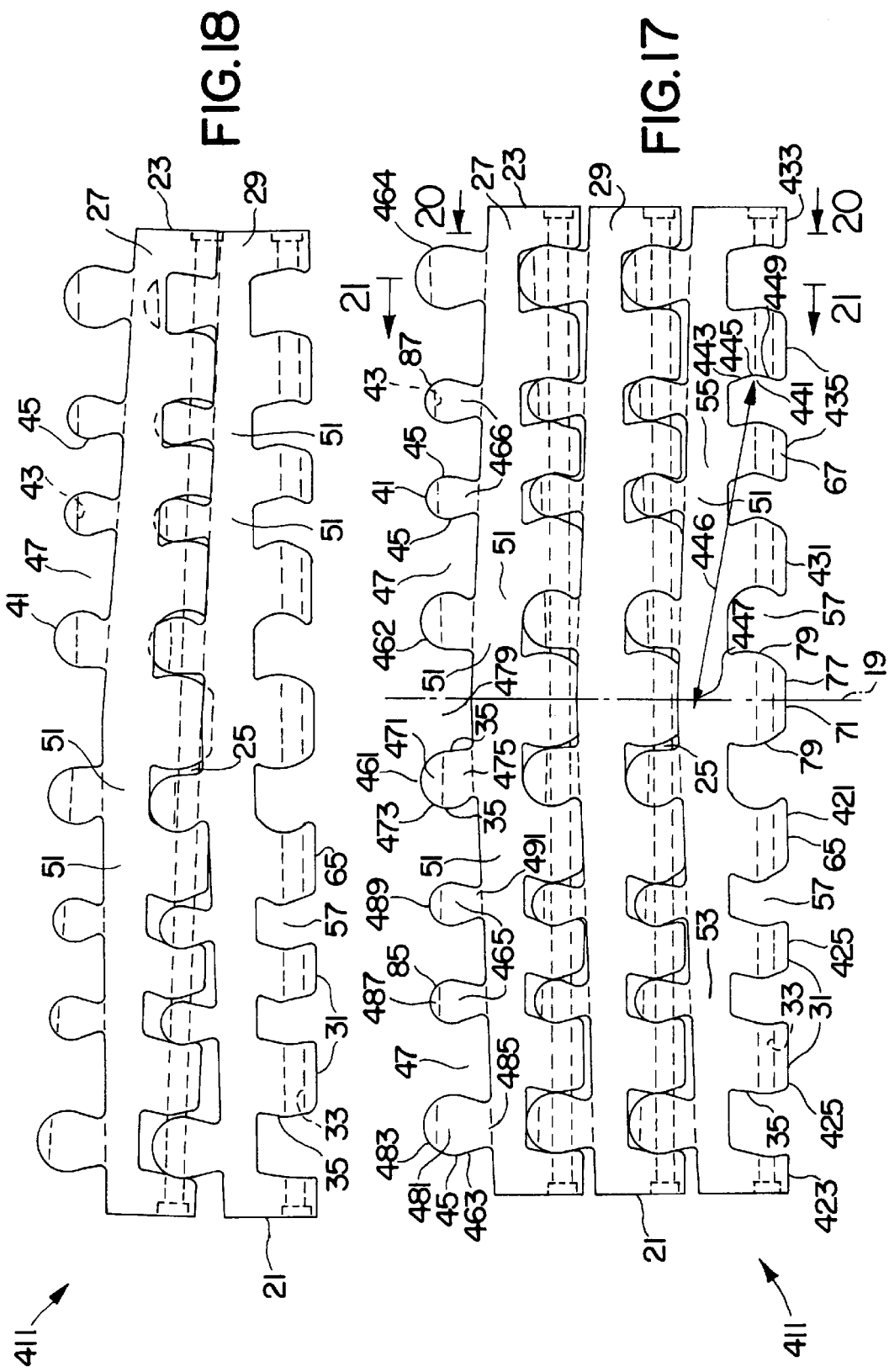

SIDE-FLEXING CONVEYOR CONSTRUCTION

BACKGROUND OF THE INVENTION

The invention relates generally to modular conveyors, belts and chains and, more particularly, to such conveyors, belts and chains which include side-flexing capability, i.e., the ability to turn left or right in the plane of conveyor movement.

In the past, side-flexing conveyors were limited in width and some of such prior side-flexing conveyors transferred the load in tension in the direction of intended conveyor travel only at the middle of the chain conveyor. Such conveyors undesireably experienced very heavy loading at the middle portion of the chain. Other prior side-flexing conveyors depended on the pins to carry the load from link to link, thereby placing a high shear load on the pins, and particularly at the ends thereof during side-flexing operation.

Previous designs for side flexing modular belting or chain involved simply forming slotted holes where the pin joins the links to allow side-flexure of the links in the direction of travel. These previous designs have several limitations. The first limitation is that, because of the slotted holes, the belt or chain can expand and compress. This elasticity requires tension to always be placed on the modular belting for proper running i.e., the belting was always preloaded for proper functionality.

The second limitation is inherent in the prior designs and results in carrying of the entire load, when the chain is side-flexing, at the sides of the chain. Thus, the outer portion of the pin carries the entire load in side-flexure because the pin only contacts the links at that point.

Attention is directed to the following U.S. Patents:

U.S. Pat. No. 3,261,451, G. C. Roinestad, Jul. 19, 1966
U.S. Pat. No. 3,826,150, K. V. Palmaer, Jul. 30, 1974
U.S. Pat. No. 3,854,575, Fraioli, Sr., Dec. 17, 1974
U.S. Pat. No. 3,946,857, Fraioli, Sr., Mar. 30, 1976
U.S. Pat. No. 4,185,737, K. Blattermann, Jan. 29,1980
U.S. Pat. No. 4,222,483, Wootton et al., Sep. 16, 1980
U.S. Pat. No. 4,276,980, Y. Oizumi, Jul. 7, 1981
U.S. Pat. No. 4,640,410, Palmaer et al., Feb. 3, 1987
U.S. Pat. No. 4,742,907, K. V. Palmaer, May 10, 1988
U.S. Pat. No. 4,846,339, G. Roinestad, Jul. 11, 1989
U.S. Pat. No. 4,901,844, Palmaer et al., Feb. 20, 1990
U.S. Pat. No. 4,934,517, J. M. Lapeyre, Jun. 19, 1990
U.S. Pat. No. 5,181,601, Palmaer et al., Jan. 26, 1993
U.S. Pat. No. 5,224,583, Palmaer et al., Jul. 6, 1993
U.S. Pat. No. 5,310,046, Palmaer et al., May 10, 1994
U.S. Pat. No. 5,372,248, P. L. Horton, Dec. 13, 1994

Attention is also directed to the following foreign patents:

0427337, EP, May 15, 1991
1,312,301, Canada, May 1, 1993

SUMMARY OF THE INVENTION

The invention provides a conveyor intended for travel along an intended direction on a given path, having a center line and laterally spaced and opposed sides, and comprising a chain pin, a first link module including a first plurality of laterally spaced eyes which respectively have therein aligned first bores receiving the chain pin, and which define a series of spaces, and a second link module including a second plurality of laterally spaced eyes which respectively have therein aligned second bores receiving the chain pin to prevent disconnection of the first and second modules, and which are received in the spaces between the first plurality of eyes so as to engage the first plurality of eyes in such manner as to directly transmit tension in the direction of conveyor movement between the first and second link modules on each side of the center line and at least during side flexing movement along the given path.

The invention also provides a conveyor intended for travel along an intended direction on a given path, having a center line and laterally spaced and opposed sides, and comprising a chain pin, a first link module including a first plurality of laterally spaced eyes which extend along the direction of the given path, which have respective spaced side portions, and which respectively have therein aligned first bores receiving the chain pin, and a second link module including a second plurality of laterally spaced eyes which are laterally offset from the first plurality of eyes, which extend in the direction opposite to the direction of extension of the first plurality of eyes, which have respective side portions, which define therebetween a plurality of spaces which receive the first plurality of eyes with the side portions of the first and second plurality of eyes in interfering engagement for transmission therebetween of tension in the direction of the given path at least during side flexing movement along the given path, and which respectively have therein aligned second bores receiving the chain pin.

The invention also provides a conveyor intended for travel along an intended direction on a given path, having a center line and laterally spaced and opposed sides, and comprising a chain pin, a first link module including a first plurality of laterally spaced eyes which extend along the direction of intended conveyor travel, and which respectively include aligned first bores receiving the chain pin, a first eye spaced from the center line at one side thereof and including a first surface extending transversely to the direction of intended conveyor travel, and a second eye spaced from the center line on the other side thereof and including a second surface extending transversely to the direction of intended conveyor travel, and a second link module including a second plurality of laterally spaced eyes which are laterally offset from the first plurality of eyes, which extend in the direction opposite to the direction of extension of the first plurality of eyes, which define therebetween a plurality of spaces which receive the first plurality of eyes, and which include aligned second bores receiving the chain pin, a third eye spaced from the center line at said one side thereof and including a third surface extending transversely to the direction of intended conveyor travel and in abutting engagement in the direction of intended conveyor travel with the first surface for transmission therebetween of tension in the direction of intended conveyor travel, and a fourth eye spaced from the center line on other side thereof and including a fourth surface extending transversely to the direction of intended conveyor travel and in abutting engagement in the direction of intended conveyor travel with the second surface for transmission therebetween of tension in the direction of intended conveyor travel on each side of the center line and at least during side flexing movement along the given path.

The invention also provides a conveyor intended for travel along a given path, having laterally spaced and opposed sides, and including side-flexing capability, the conveyor comprising a chain pin, a first link module including a first center line extending in the direction of intended conveyor travel, a first spine portion which extends laterally in both directions from the first center line, and a first plurality of laterally spaced eyes which extend from the first spine portion in respective arcs respectively defined by first radii extending from a first common center located on the first center line and respectively including arcuately extending side portions, and which respectively have therein aligned first bores receiving the chain pin, and a second link module including a second center line extending in the direction of intended conveyor travel, a second spine portion which extends laterally in both directions from the second center line, and a second plurality of laterally spaced eyes which are laterally offset from the first plurality of eyes, which extend from the second spine portion in the direction opposite to the direction of extension of the first plurality of eyes, which respectively extend in arcs respectively defined by second radii extending from a second common center located on the second center line, which respectively include arcuately extending side portions, which define therebetween a plurality of arcuately extending spaces loosely receiving the first plurality of eyes with the side portions of the first and second plurality of eyes in interfering engagement in the direction of the given path for transmission therebetween of tension in the direction of the given path on each side of the center line and at least during side flexing movement along the given path, and which respectively have therein aligned second bores receiving the chain pin.

The invention also provides a conveyor intended for travel along an intended direction on a given path, having a center line and laterally spaced and opposed sides, and comprising a chain pin, a first link module including a first laterally extending spine portion, and a first plurality of laterally spaced eyes which extend from the first spine portion along the direction of the given path, which are of generally circular shape with a first transverse dimension and include respective spaced side portions, and which respectively have therein aligned first bores receiving the chain pin, and a second link module including a second laterally extending spine portion, and a second plurality of laterally spaced eyes which are laterally offset from the first plurality of eyes, which extend from the second spine portion in the direction opposite to the direction of extension of the first plurality of eyes, which include respective side portions, which define therebetween a plurality of spaces of generally circular shape having a transverse dimension greater than the first dimension, and loosely receiving the first plurality of eyes with the side portions of the first and second plurality of eyes in interfering engagement in the direction of the given path for transmission therebetween of tension in the direction of the given path on each side of the center line and at least during side flexing movement along the given path, and which respectively have therein aligned second bores receiving the chain pin.

The invention also provides a conveyor intended for travel along a given path, and having a center line extending in the direction of intended conveyor travel and laterally spaced and opposed sides, the conveyor comprising a chain pin, a first link module including a first plurality of laterally spaced eyes including respective aligned first bores receiving the chain pin, and a first eye located on one side of the center line, extending in inclined relation to the center line, and including a first edge surface, and a second link module including a second plurality of laterally spaced eyes which are laterally offset from the first plurality of eyes, which define therebetween a plurality of spaces loosely receiving the first plurality of eyes, and which include respective aligned second bores receiving the chain pin, and a second eye located on the one side of the center line, extending in inclined relation to the center line and in generally parallel relation to the first eye, and including a second edge surface located for interfering engagement with the first edge surface in the direction of intended conveyor movement so as to transmit therebetween tension in the direction of intended conveyor movement on each side of the center line and at least during side flexing movement along the given path.

The invention also provides a conveyor intended for travel along a given path, having a center line and laterally spaced and opposed sides, and comprising a chain pin, a first link module including a first spine portion which extends laterally in both directions from said first center line, and a first plurality of laterally spaced eyes which extend from said first spine portion along the direction of intended conveyor travel, which respectively include aligned first bores receiving said chain pin, and arcuate side portions defined by radii extending from a common center located on said center line and in spaced relation in the direction of extension of said first plurality of eyes, and a second link module including a second spine portion which extends laterally in both directions from said second center line, and a second plurality of laterally spaced eyes which are laterally offset from said first plurality of eyes, which extend from said second spine portion in the direction opposite to the direction of extension of said first plurality of eyes, which respectively include aligned second bores receiving said chain pin, and arcuate side portions, and which define therebetween a plurality of spaces extending in inclined relation to said second center line and loosely receiving said first plurality of eyes with said arcuate side portions of said first and second plurality of eyes in interfering engagement in the direction of the given path for transmission therebetween of tension in the direction of the given path on each side of the center line and at least during side flexing movement along the given path.

The invention also provides a conveyor intended for travel along a given path, and having a center line extending in the direction of intended conveyor travel and laterally spaced and opposed sides, the conveyor comprising a chain pin, a first link module including a first spine portion which extends laterally in both directions from the center line, and a first plurality of laterally spaced eyes which project from the first spine portion along the direction of intended conveyor travel, which respectively have laterally spaced sides defining therebetween a first plurality of spaces, and which respectively have therein bores aligned in perpendicular relation to the center line, and which receive the chain pin, and a second link module including a second spine portion which extends laterally in both directions from the center line, and a second plurality of laterally spaced eyes which are laterally offset from the first plurality of eyes, which project from the second spine portion in the direction opposite to the direction of extension of the first plurality of eyes, which have respective side portions defining therebetween a second plurality of spaces receiving the first plurality of eyes with the arcuate side portions of the first and second plurality of eyes in interfering engagement on each side of said center line for transmission therebetween of tension in the direction of the given path at least during side flexing movement along the given path, and which respectively have therein aligned bores receiving the chain pin.

One of the objects of the invention is to provide a side-flexing modular conveyor, belt, or chain which is made of links bound together by hinge pins and which differs from prior modular conveyors, or belts, or chains in that the disclosed conveyors, belts, or chains fit together in such a way that the eyes of the links carry the load of the chains.

More specifically, the curved eyes or interfering side surfaces of the disclosed construction allow for the links to intermesh and interfere with each other in such a way that load and chain tension is transferred from link to link rather than from link to pin to link.

Other features and advantages of the invention will become apparent to those skilled in the art upon review of the following detailed description, claims and drawings.

GENERAL DESCRIPTION OF THE DRAWINGS

FIG. 1 is a fragmentary plan view of a first embodiment of a conveyor incorporating various of the features of the invention.

FIG. 2 is a sectional view taken along line 2—2 of FIG. 1.

FIG. 3 is a sectional view taken along line 3—3 of FIG. 1.

FIG. 4 is a fragmentary, enlarged, and brokenaway view of a center portion of the conveyor shown in FIG. 1.

FIG. 5 is a fragmentary plan view of a second embodiment of a conveyor which incorporates various of the features of the invention and which is shown in a straight forward movement condition.

FIG. 6 is a view which is similar to FIG. 5 and which shows the conveyor of FIG. 5 in a side-flexure movement condition.

FIG. 12 is a fragmentary plan view of a third embodiment of a conveyor which incorporates various of the features of the invention and which is shown in straight forward movement condition.

FIG. 13 is a view which is similar to FIG. 12 and which shows the conveyor of FIG. 12 in a side-flexure movement condition.

FIG. 17 is a fragmentary plan view of a fourth embodiment of a conveyor which incorporates various of the features of the invention and which is shown in straight forward movement condition.

FIG. 18 is a view which is similar to FIG. 17 and which shows the conveyor of FIG. 17 in side-flexure movement condition.

Figure 7:
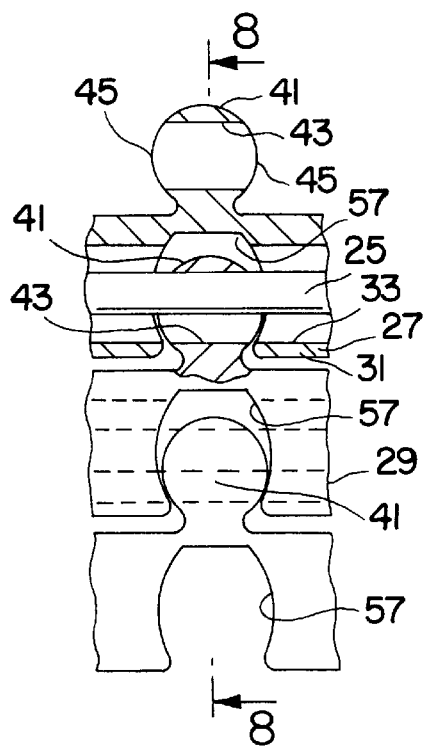
FIG. 7 is a fragmentary, enlarged, and partially broken-away view of an intermediate portion of the conveyor shown in FIGS. 5 and 6.

Before one embodiment of the invention is explained in detail, it is to be understood that the invention is not limited in its application to the details of the construction and the arrangements of components set forth in the following description or illustrated in the drawings. The invention is capable of other embodiments and of being practiced or being carried out in various ways. Also, it is understood that the phraseology and terminology used herein is for the purpose of description and should not be regarded as limiting.

GENERAL DESCRIPTION OF THE INVENTION

Illustrated respectively in FIGS. 1, 5, 12, and 17 are first, second, third, and fourth modular conveyors or link belts or chains 111, 211, 311, and 411, respectively, which are respectively intended for travel along intended directions of conveyor movement on given paths having a central axis or center line 19. The first, second, third, and fourth modular conveyors or link belts or chains 111, 211, 311, and 411 respectively have laterally spaced and opposed sides 21 and 23, and have side-flexing capability. Each of the first, second, third, and fourth conveyors or link belts or chains 111, 211, 311, and 411 comprises a plurality of chain or hinge pins 25 which pivotally and serially interconnect a plurality of link modules including a first link module 27 and a second link module 29.

The first link module 27 includes a first plurality of laterally spaced eyes 31 which extend along the intended direction of conveyor travel and which respectively have therein laterally aligned first bores 33 receiving one of the chain pins 25. At least one of the first plurality of eyes 31 has a first side portion or edge surface 35.

The second link module 29 includes a second plurality of laterally spaced eyes 41 which are laterally offset from the first plurality of eyes 31, which extend in the direction opposite to the direction of extension of the first plurality of eyes 31, which respectively have therein laterally aligned second bores 43 receiving the before mentioned one chain pin 25, and which define therebetween a plurality of spaces 47 which loosely receive the first plurality of eyes 31. At least one of the second plurality of eyes 41 includes a second side portion or edge surface 45 which is located for interfering engagement with the first side portion or edge surface 35 in the intended direction of conveyor travel so as to transmit tension or load between the first and second link modules 27 and 29 in the intended direction of conveyor movement or travel.

In the disclosed conveyors, the transmission of tension or load between the first and second link modules 27 and 29 occurs independently of the receipt of the chain pin 25 in the bores 33 and 43 of the first and second plurality of eyes 31 and 41, and the receipt of the chain pin 25 in the first and second plurality of eyes 31 and 41 prevents disengagement of the first and second plurality of eyes 31 and 41, and, hence, the first and second link modules 27 and 29, from each other.

In addition, in the disclosed conveyors, at least one eye of the first plurality of eyes 31 and one eye of the second plurality of eyes 41 are located for interfering engagement with each other in a direction transverse to the intended direction of conveyor movement or travel so as to prevent substantial movement between the first and second link modules 27 and 29 in the direction transverse to the intended direction of conveyor movement or travel.

The link modules 27 and 29 can be fabricated from any suitable material in any suitable way. However, in the disclosed embodiments, the link modules 27 and 29 are both preferably molded of relatively hard plastic in a generally identical configuration or shape.

The chain or hinge pins 25 can be constructed of any suitable material.

FIRST EMBODIMENT

More specifically, as particularly shown in FIGS. 1 thorough 4, the link modules (including the first and second link modules 27 and 29) of the first conveyor or link belt 111 each include a spine portion 51 which generally extends the full width of the first conveyor or link belt 111, and which interconnects the first and second pluralities of eyes 31 and 41. While other constructions can be employed, in the first conveyor or link belt 111, the spine portion 51 includes laterally opposite first and second side portions 53 and 55 which extend laterally in both directions from the center line or central axis 19, and, adjacent the conveyor sides 21 and 23, curve somewhat in the intended direction of conveyor movement or travel, either forwardly or rearwardly.

Each of the link modules of the first conveyor or link belt 111 includes both the before mentioned first and second pluralities of eyes 31 and 41, as well as the plurality of spaces 47 defined between the second plurality of eyes 41, and another plurality of spaces 57 which are defined between the first plurality of eyes 31, and which receive another plurality of eyes (corresponding to the before mentioned second plurality of eyes) of another adjacent link module.

While other specific constructions can be employed, in the first conveyor or link belt 111, the first plurality of eyes 31 extend from the first spine side portion 53 in respective arcs respectively defined by radii 59 which extend from a common center 61 located on the center line 19, and which are of progressively greater length in accordance with increased spacing of the eyes 31 from the center line 19. As already mentioned, in the first conveyor 111, each of the first plurality of eyes 31 respectively includes a laterally spaced pair of the before mentioned side portions or edge surfaces 35 which extend arcuately.

More specifically, as shown best in FIGS. 1 and 4, the first plurality of eyes 31 includes a first series 65 of eyes extending on one side of the center line 19 in arcuately concave relation to the center line 19, and a second series 67 of eyes extending on the other side of the center line 19 in arcuately concave relation to the center line 19 and in opposing relation to the first series 65 of eyes. The eyes 31 of the first and second series 65 and 67 respectively include transversely extending outer end surfaces or edges 69 which are transversely aligned with each other.

The arcuately extending eyes 31 of the first plurality have a first radially extending width 70 and are respectively transversely spaced from one another at given distances.

The first plurality of eyes 31 also includes (see FIG. 4) a center eye 71 projecting along the center line 19 and including a stem portion 73, and a truncated circular ring portion 75 extending from the stem portion 73 and including two laterally spaced branches 77 each including a laterally spaced pair of the before mentioned side portions or edge surfaces 79 defined by radii extending from the common point 61, and laterally aligned end surfaces or edges 80 which are aligned with the end surfaces 69.

As shown, the bores 33 of the first link module 27 are tapered or flared and the bores 43 of the second link module 29 are cylindrical. However, in an alternate construction, the bores 43 can be flared or elongated and the bores 33 can be cylindrical.

The second plurality of laterally spaced eyes 41 of the first conveyor or link belt 111 are laterally offset from the first plurality of eyes 31, extend from the spine portion 51 in the direction opposite to the direction of extension of the first plurality of eyes 31, and respectively extend in arcs respectively defined by radii 81 extending from the center 61 located on the center line 19. As already mentioned, each of the second plurality of eyes 41 respectively also includes a laterally spaced pair of the before mentioned side portions or edge surfaces 45 which extend arcuately.

More specifically, the second plurality of eyes 31 includes a first series 85 of eyes extending on one side of the center line 19 in arcuately concave relation to the center line 19 and a second series 87 of eyes extending on the other side of the center line 19 in arcuately concave relation to the center line and in opposing relation to the first series 85 of eyes. The eyes 41 of the second plurality respectively also include laterally aligned, transversely extending outer end surfaces or edges 89 which extend at increasing distances from the spine portion 51 in accordance with increased spacing of the eyes 41 from the center line 19 and which are transversely aligned with each other.

The second plurality of eyes 41 also includes (see FIG. 4) a center or middle eye 91 projecting along the center line 19 and including a stem portion 93, and a truncated circular portion 95 extending from the stem portion 93 and including an end surface or edge 97 laterally aligned with the outer end surfaces or edges 89 of the first and second series 85 and 87, and a pair of laterally spaced circular side portions or edge surfaces 99.

The second plurality of eyes 41 has a second radially extending width 98 about equal to the radial width 70 of the eyes 31 of the first plurality and also define therebetween the before mentioned plurality of spaces 47 which extend arcuately in spaced relation to one another, which are slightly larger than the radial width 70 of the first plurality of eyes 31, and which loosely receive the first plurality of eyes 31 with the side portions or edge surfaces 35 and 45 of the first and second plurality of eyes 31 and 41 (and the side portions or edge surfaces 79 and 99) located for interfering engagement in the intended direction of conveyor movement so as to transmit tension between the first and second link modules 27 and 29 in the direction of intended conveyor movement.

As a consequence of the arcuate shape of the eyes 31 and the spaces 47 and the loose receipt of the eyes 31 in the spaces 47, the connected link modules 27 and 29 can swivel or side-flex relative to one another about the center 61, while, at the same time, the side portions or edge surfaces 35 and 45 thereof (and the side portions or edge surfaces 79 and 99) are located for abutting and interfering engagement in the intended direction of conveyor travel so as to transmit tension or load between the first and second link modules 27 and 29 along the given path, i.e., in the intended direction of conveyor travel. Such tension or load is transmitted at laterally spaced intervals along the entire width of the conveyor or belt 111, notwithstanding side-flexing (and also during straight forward movement), due to abutting and interfering engagement therebetween in the direction of conveyor movement of the side portions or edge surfaces 35 and 45 (and the side portions or edge surfaces 79 and 99) of the first and second plurality of eyes 31 and 41, and generally independently of the receipt of the chain pin or hinge pin 25 in the aligned bores 33 and 43. Such abutting and interfering engagement also prevents withdrawal of the eyes 31 from the spaces 47 in response to the application of load or tension in the intended direction of conveyor travel.

While other constructions can be employed, in the link modules 27 and 29 of the first conveyor or link belt 111, at least one of the aligned first and second (series of) bores 33 and 43 is generally cylindrical in shape (the bores 33 in the disclosed construction) and the other of the aligned first and second (series of) bores 33 and 43 is elongated in the direction of intended conveyor travel (the bores 43 in the disclosed construction) so as to accommodate conveyor side-flexure. In the conveyor or link belt 111, shown in FIG. 1, the length of the elongation of the series of bores 43 becomes progressively larger in accordance with the spacing of the eyes 41 from the center line 19, thereby enabling the chain 111 to side-flex or swivel about the center 61. Thus, in the specifically disclosed construction shown in FIGS. 1 through 4, and because tension or load, in the direction of intended conveyor travel, is transmitted between the interdigitated eyes 31 and 41 of the adjacent link modules 27 and 29, there is little or no load in shear on the chain or hinge pin 25 due to the tension or load in the direction of chain travel. While the illustrated construction discloses the bores 33 as being cylindrical in shape and the bores 43 as being elongated in shape, if desired, the bores 33 can be elongated and the bores 43 can be cylindrical. Furthermore, if desired the bores 33 and 43 can both be flared or elongated.

Any suitable arrangement can be employed to advance the first conveyor 111 along the associated given path. In the specifically disclosed construction, the underside of at least one of the first plurality of eyes 31 includes a driving recess defined by a surface 101 adapted to receive the teeth of a driving sprocket (not shown).

SECOND EMBODIMENT

Figure 10:
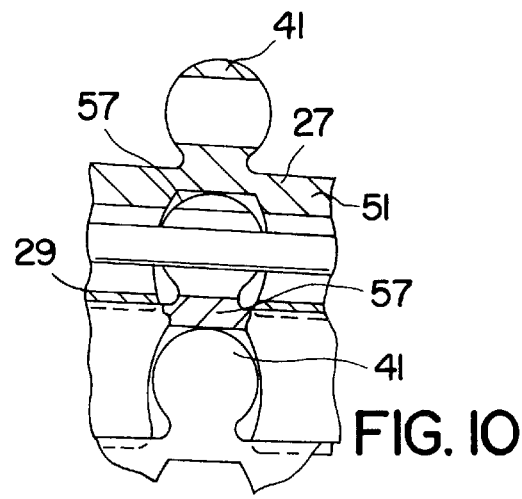
FIG. 10 is a fragmentary, enlarged, and partially broken-away view of another intermediate portion of the conveyor shown in FIGS. 5 and 6.
Figure 11:
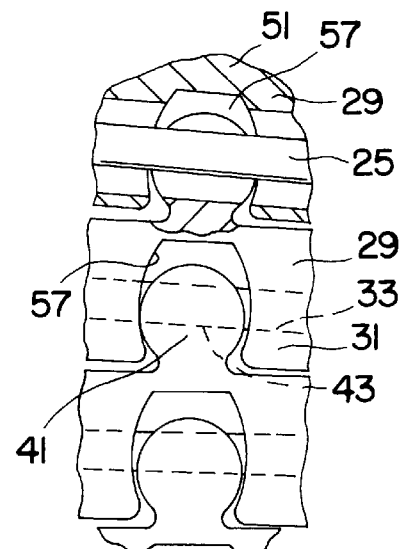
FIG. 11 is a fragmentary, enlarged, and partially broken-away view of still another intermediate portion of the conveyor shown in FIGS. 5 and 6.
Figure 8:
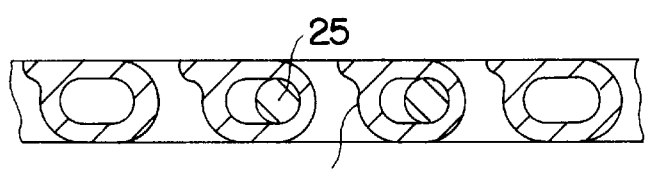
FIG. 8 is a sectional view taken along line 8—8 of FIG. 7.
Figure 9:
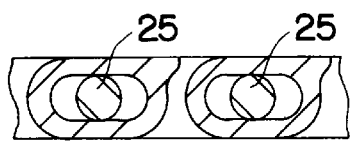
FIG. 9 is a sectional view taken along line 9—9 of FIG. 5.

As particularly shown in FIGS. 5 through 11, in the second conveyor or link belt or chain 211, the link modules (including the first and second link modules 31 and 41) each include a spine portion 51 which generally extends the full width of the conveyor or link belt 211, and which interconnects the first and second pluralities of eyes 31 and 41.

Each of the link modules 27 and 29 includes both the before mentioned first and second pluralities of eyes 31 and 41, as well as the plurality of spaces 47 defined between the second plurality of eyes 41, and another plurality of spaces 57 which are defined between the first plurality of eyes 31, and which receive another plurality of eyes (corresponding to the before mentioned second plurality of eyes) of another adjacent link module.

While other specific constructions can be employed, in the second conveyor or link belt 211, the second plurality of eyes 41 include a stem or neck portion 221 having a transverse width 223, and a main or circular portion 225 having a maximum lateral or transverse width 227 substantially greater than the width 223 of the neck or stem portion 221, and a laterally spaced pair of the before mentioned side portions or edge surfaces 45 which are generally outwardly convex in shape.

While other specific constructions can be employed, in the second conveyor or link belt 211, the first plurality of eyes 31 are generally of identical circular shape and include outwardly concave side portions or edge surfaces 35 defining partially circular spaces 57 which are somewhat larger than the eyes 41.

The spaces 57 each include a central or main portion 231 which is defined by a laterally spaced pair of the before mentioned generally outwardly concave side portions or edge surfaces 35. The main portion 231 has a maximum width 233 and receives the main portion 225 of the associated one of the plurality of eyes 41. In addition, the spaces 57 each include an entry neck or opening 235 which communicates with the main portion 231, which receives the stem or neck portion 221 of the associated eye 41, and which has a lateral width 237 less than the maximum transverse width 227 of the main portion 225 of the eye 41.

As a consequence of the circular shape of the eyes 41 and the spaces 57, and the loose receipt of the eyes 41 in the spaces 57, and the lesser transverse neck width 237 as compared to the maximum eye width 227, the connected link modules 27 and 29 can swivel or side-flex relative to one another from either of the conveyor sides 21 or 23, while, at the same time, the side portions or edge surfaces thereof 35 and 45 are located for abutting and interfering engagement therebetween in the intended direction of conveyor travel (and in position to prevent escape from such relation consequent to either forward or side-flexing movement in the plane of intended conveyor movement) and so as thereby to transmit tension or load between the first and second link modules 27 and 29 along the given path, i.e., in the intended direction of conveyor travel.

Such tension or load is transmitted at multiple laterally spaced intervals along the entire width of the conveyor or belt or chain 211, notwithstanding side-flexing (or during straight forward movement) due to the interfering engagement in the direction of conveyor movement of the side portions or edge surfaces and 45 of the first and second plurality of eyes 31 and 41 and generally independently of the receipt of the chain pin or hinge pin 25 in the aligned bores 33 and 43.

While other constructions can be employed, in the link modules 27 and 29 of the second conveyor or link belt 211, at least one of the aligned first and second (series of) bores 33 and 43 is generally cylindrical in shape and the other of the aligned first and second (series of) bores 33 and 43 is elongated in the direction of intended conveyor travel so as to accommodate conveyor side-flexure. In the conveyor or link belt 211, shown in FIGS. 5 through 11, both series of bores 33 and 43 are elongated so as to enable the conveyor or belt or chain 211 to side-flex or swivel from either of the conveyor sides 21 and 23. In the specifically disclosed construction, and because tension or load, in the direction of intended conveyor travel, is transmitted between the interdigitated eyes 31 and 41 of the adjacent link modules 27 and 29, both series of bores 33 and 43 are elongated (at a common length) in the intended direction of conveyor travel.

Any suitable arrangement can be employed to advance the conveyor 211 along the associated given path. In the specifically disclosed construction, the underside of at least one of the first plurality of eyes 31 includes a driving recess defined by a surface 301 adapted to receive the teeth of a driving sprocket (not shown).

THIRD EMBODIMENT

Figure 14:
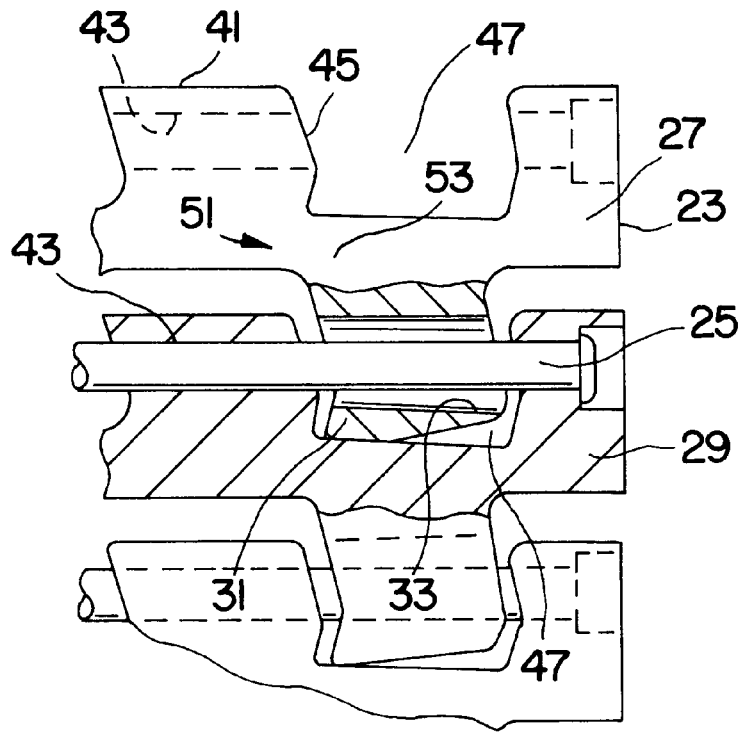
FIG. 14 is a fragmentary, enlarged, and partially broken-away view of an end portion of the conveyor shown in FIGS. 12 and 13.
Figure 15:
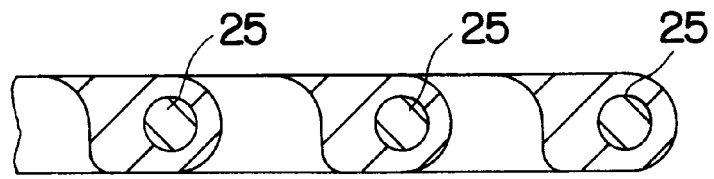
FIG. 15 is a sectional view taken along line 15—15 of FIG. 12.
Figure 16:
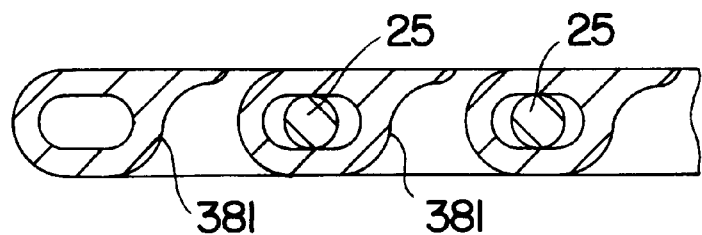
FIG. 16 is a sectional view taken along line 16—16 of FIG. 12.

As particularly shown in FIGS. 12 through 16, in the third conveyor or link belt or chain 311, the link modules (including the first and second link modules 27 and 29) each include a spine portion 51 which, while other constructions can be employed, extends generally the full width of the third conveyor or link belt or chain 311 and in generally perpendicular relation to the center line 19, which interconnects the first and second pluralities of eyes 31 and 41, and which includes, on one side of the center line 19, a first spine side portion 53, and, on the other side of the center line 19, a second spine side portion 55.

Each of the link modules 27 and 29 of the third conveyor or link belt or chain 311 includes both the before mentioned first and second pluralities of eyes 31 and 41, as well as the plurality of spaces 47 defined between the second plurality of eyes 41, and another plurality of spaces 57 which are defined between the first plurality of eyes 31, and which receive another plurality of eyes (corresponding to the before mentioned second plurality of eyes) of another adjacent link module. The first and second plurality of eyes 31 and 41 respectively also include laterally aligned first and second bores 33 and 43 receiving one of the chain pins 25.

More specifically, and while other specific constructions can be employed, in the third conveyor or link belt or chain 311, the first plurality of eyes 31 includes a first series 65 of eyes extending from the first spine side portion 53 on one side of the center line 19 and in the direction away from the spine portion 51 and toward the center line 19 and which are defined, at least in part, by the before mentioned side portions or edge surfaces 35 which extend in generally laterally spaced and generally parallel relation to one another and in inclined relation away from the spine portion 51 and toward the center line 19.

One of the side portions or edge surfaces 35 of each of the eyes in the first series 65 is connected to the first spine side portion 53 by a connecting edge portion or surface 321 which is preferably arcuate or curved and which extends in convexly facing relation to the center line 19. The other one of the side portions or edge surfaces 35 of each eye in the first series 65 is connected to the first spine side portion 53 by a connecting edge portion or surface 323 which extends at an obtuse angle to the spine side portion 53 and merges into the connected side portion or edge surface 35.

The first series 65 of eyes of the first plurality of eyes 31 also includes an eye 341 located in spaced, adjacent relation to the center line 19 and having a side portion or edge surface 97 which is located adjacent the center line 19.

In addition, in the conveyor or belt or chain 311, the first plurality of eyes 31 also includes a second series 67 of eyes extending from the second spine side portion 55 on the other side of the center line 19 and in the direction away from the spine portion 51 and toward the center line 19 and which are defined by laterally spaced, and generally parallel side portions or edge surfaces 35 which are inclined away from the spine portion 51 and toward the center line 19.

One of the side portions or edge surfaces 35 of each of the eyes in the second series 67 is connected to the second spine side portion 55 by a connecting edge portion or surface 331 which is preferably arcuate or curved and extends in convexly facing relation to the center line 19. The other one of the side portions or edge surfaces 35 of each eye in the second series 67 is connected to the second spine side portion 55 by a connecting edge portion or surface 333 which extends at an obtuse angle to the spine side portion 55 and merges into the connected side portion or edge surface 35.

The second series 67 of eyes of the first plurality of eyes 31 also includes an eye 351 located in spaced and adjacent relation to the center line 19 and having a side portion or edge surface 97 which is located adjacent the center line 19 and which, together with the side portion or edge surface 97 of the eye 341, define a center or middle space 361.

In the third conveyor or link belt or chain 311, the second plurality of eyes 41 includes a first series 85 of eyes which are located on one side of the center line 19, which extend from the first spine side portion 53 in the opposite direction from the first series 65 of the first plurality of eyes 31 and in inclined relation to the center line 19 and which are defined, at least in part, by the before mentioned side portions or edge surfaces 45 which extend in generally laterally spaced and generally parallel relation to one another and in inclined relation away from the spine portion 51 and toward the center line 19. While other constructions can be employed, in this disclosed embodiment, the first series 85 of eyes of the second plurality of eyes 41 are laterally spaced from each other at generally common distances and have generally common lateral widths.

One of the side portions or edge surfaces 45 of each of the eyes in the first series 85 of eyes is connected to the first spine side portion 53 by a connecting edge portion or surface 341 which is preferably arcuate or curved and which extends in concavely facing relation to the center line 19. The other one of the side portions or edge surfaces 45 of each eye in the first series 85 is connected to the first spine side portion 53 by a connecting edge portion or surface 343 which extends at an acute angle to the spine side portion 53 and in inclined relation to, and at an obtuse angle to, the connected side portion 45.

The second plurality of eyes 41 of the conveyor or belt or chain 311 includes a second series 87 of eyes which are located on the other side of the center line 19, and which extend from the second spine side portion 55 in the opposite direction from the second series 67 of the first plurality of eyes 31 and in inclined relation to the center line in the opposite sense from the first series 85 of eyes. While other constructions can be employed, in the conveyor 311, the second series 87 of eyes of the second plurality of eyes 41 are laterally spaced from each other at generally common distances and have generally common lateral widths.

One of the side portions or edge surfaces 45 of each of the eyes in the second series 87 is connected to the second spine side portion 55 by a connecting edge portion or surface 341 which is preferably arcuate or curved and extends in concavely facing relation to the center line 19. The other one of the side portions or edge surfaces 45 of each eye in the second series 87 is connected to the second spine side portion 55 by a connecting edge portion or surface 343 which extends at an acute angle to the spine side portion 55 and in inclined relation to, and at an obtuse angle to, the connected side portion 45.

Still further in addition, the second plurality of eyes 41 of the conveyor 311 includes a center or middle eye 71 which projects along the center line 19 and which is loosely received in the space 361. The center eye 71 includes an outer transverse end or edge surface 77, and a pair of laterally spaced converging side portions or edge surfaces 79 which extend between the spine portion 51 and the outer end or edge surface 77 and which engage the side portions or edge surfaces 97 of the eyes 341 and 351 of the first plurality of eyes 31.

The spaces 47 and 361 respectively receive the eyes 31 and the center eye 71 in such manner as to locate the side portions or edge surfaces 35 and 45 (and the side portions or edge surfaces 79 and 97) for abutting and interfering engagement in the intended direction of conveyor travel so as to transmit tension or load between the link modules 27 and 29 along the given path, i.e., in the intended direction of conveyor travel. Such load or tension is transmitted at laterally spaced intervals along the entire width of the conveyor or belt 311, notwithstanding side-flexing, (and during straight forward conveyor movement), due to the interfering engagement in the direction of conveyor movement of the side portions or edge surfaces 35 and 45 (and the side portions or edge surfaces 79 and 97) of the first and second plurality of ears 31 and 41 and independently of the receipt of the associated one of the chains pin 25 in the first and second plurality of eyes 31 and 41.

More specifically, in the conveyor or belt or chain 311, the respective side portions or edge surface of each eye of the first plurality of eyes 31 include an adjacent side portion or edge surface 371 which is located adjacent to the center line 19 and which includes an outer end 373, and a remote side portion or edge surface 375 which is located remotely from the center line 19 and which includes an outer end 377. In addition, in the conveyor or belt or chain 311, the respective side portions 45 of each eye of the second plurality of eyes 41 include an adjacent side portion or edge surface 372 which is located adjacent to the center line 19 and which includes an outer end 374, and a remote side portion or edge surface 376 which is located remotely from the center line 19 and which includes an outer end 378.

In this regard, the outer ends 373 of the adjacent side portions 371 of the first plurality of eyes 31 are located at respective first given distances 381 (one shown) from the center line 19, whereas the outer ends 378 of the remote side portions 376 of the inwardly adjacent eye of the second plurality of eyes 41 are located at a second given distance 383 from the center line 19 less than the first given distance 381 so that the outer ends 377 of the remote side portions 375 of the first plurality of eyes 31 are located, with respect to the outer ends 378 of the remote side portions 376 of the second plurality of eyes 41, in position for abutting and interfering engagement therebetween in the direction of conveyor travel (and in position to prevent escape from such relation consequent to either forward or side-flexing movement in the plane of intended conveyor movement) and so as thereby to transmit tension or load between the connected link modules 27 and 29 in the intended direction of conveyor travel.

Furthermore, as in the first and second conveyors 111 and 211, in the conveyor or belt or chain 311, receipt of one of the chain pins 25 in the aligned bores 33 and 43 of the first and second plurality of eyes 31 and 41 prevents disengagement of the first and second plurality of eyes 31 and 41 from each other.

One or both of the first and second transversely aligned series of bores 33 and 43 is elongated in the direction of intended conveyor travel to accommodate side-flexing of the conveyer 311. While other constructions can be employed, in the conveyor 311, the bores 43 are of generally constant diameter, and the bores 33 are elongated in the direction of conveyor travel at a generally common distance to accommodate pivoting or side-flexing of the conveyor about either of the conveyor sides 21 and 23.

In addition, at least one of the eyes of the first plurality of eyes 31 and one of eyes of the second plurality of eyes 41 are located for interfering engagement with each other in a direction transverse to the intended direction of conveyor movement so as to prevent substantial movement therebetween in the direction transverse to the direction of intended conveyor movement.

Any suitable arrangement can be employed to advance the third conveyor 311 along the associated given path. In the specifically disclosed construction, the underside of at least one of the first plurality of eyes 31 includes a driving recess including a surface 381 adapted to be engaged by the teeth of a driving sprocket (not shown).

As in the other embodiments, in the third conveyor, belt, or chain 311, the first plurality of eyes 31 of one of the link modules 27 and 29 are received in the plurality of spaces 47 defined by the second plurality of eyes 41 on the adjacent link module in such manner as to locate the eye side portions or edge surfaces 35 and 45 for interfering engagement in the direction of intended conveyor travel so as to transmit tension or load therebetween along the given path, i.e., in the direction of intended conveyor travel. Such tension or load is transmitted at several laterally spaced intervals or locations along the width of the conveyor or belt or chain 311, notwithstanding side-flexing (or straight forward movement), due to the interfering engagement in the direction of conveyor movement of the side portions or edge surfaces of the first and second plurality of eyes 31 and 41 and independently of the receipt of the associated one of the chain pins 25 in the first and second plurality of eyes 31 and 41.

FOURTH EMBODIMENT

Figure 19:
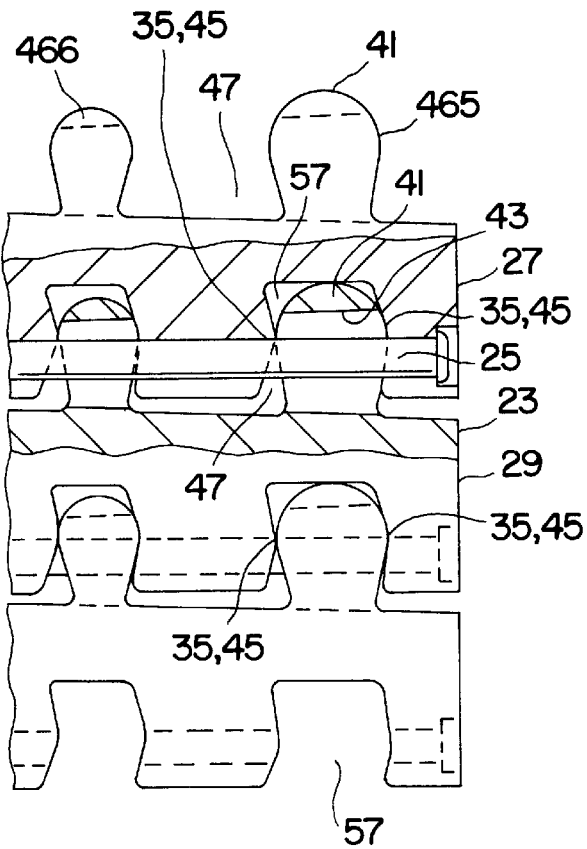
FIG. 19 is a fragmentary, enlarged, and partially broken-away view of an end portion of the conveyor shown in FIGS. 17 and 18.
Figure 20:
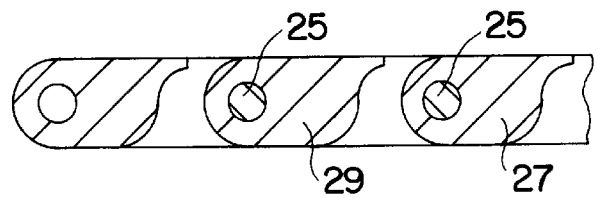
FIG. 20 is a sectional view taken along line 20—20 of FIG. 17.
Figure 21:
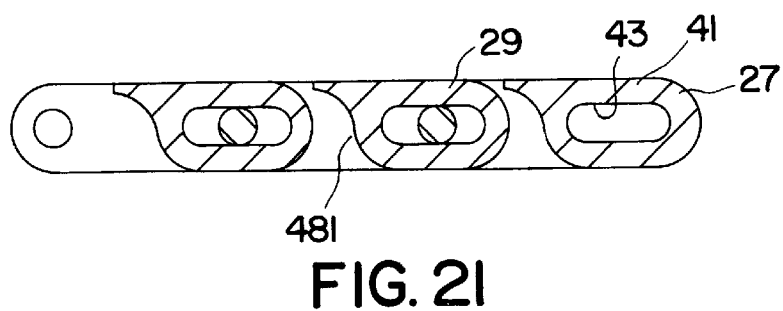
FIG. 21 is a sectional view taken along line 21—21 of FIG. 17.

More specifically, and as particularly shown in FIGS. 17 through 21, in the fourth conveyor or link belt or chain 411, the link modules (including the first and second link modules 27 and 29) each include a spine portion 51 which generally extends the full width of the fourth conveyor or link belt 411, and which interconnects the first and second pluralities of eyes 31 and 41. While other constructions can be employed, in the fourth conveyor or link belt 411, the spine portion 51 includes first and second opposite side portions 53 and 55 which extend laterally in both directions from the center line or central axis 19 and in converging, inclined relation to the central axis.

Each of the link modules of the fourth conveyor or link belt or chain 411 includes both the before mentioned first and second pluralities of eyes 31 and 41, as well as the plurality of spaces 47 defined between the second plurality of eyes 41, and another plurality of spaces 57 which are defined between the first plurality of eyes 31, and which receive another plurality of eyes (corresponding to the before mentioned second plurality of eyes) of another adjacent link module.

The first and second plurality of eyes 31 and 41 respectively include transversely aligned first and second bores 33 and 43 receiving one of the chain pins 25.

More particularly, and while other specific constructions can be employed, the first plurality of eyes 31 of the fourth conveyor or belt or chain 411 includes a first series 65 of eyes which extend from the first spine side portion 53, on one side of the center line 19, and along the intended direction of conveyor travel. The first series of eyes 65 of the first plurality of eyes 31 includes an inner eye 421 located in spaced relation to the center line 19, an outer eye 423 located adjacent the conveyor side 21, and one or more intermediate eyes 425 located intermediate the inner and outer eyes 421 and 423 and in spaced relation to one another and to the inner and outer eyes 421 and 423 to define therebetween a series of spaces 57.

The first plurality of eyes 31 also includes a second series of eyes 67 which extend from the second spine side portion 55 on the other side of the center line 19 and along the intended direction of conveyor travel and which include an inner eye 431 located in spaced relation to the center line 19, an outer eye 433 adjacent the conveyor side 23, and one or more intermediate eyes 435 located intermediate the inner and outer eyes 431 and 433 and in spaced relation to one another and to the inner and outer eyes 431 and 433 to define therebetween a series of spaces 57.

The eyes of the first and second series 65 and 67 of the first plurality of eyes 31 are defined, in part, by side surfaces 441 located in transversely spaced and laterally aligned relation to one another. The side surfaces 441 include inner portions 443 which constitute the before mentioned side portions or edge surfaces 35, which can be straight or slightly curved, which extend in inclined relation from the spine portion 51 in acute angular relation thereto, and which have respective outer ends 445 located at respective distances 446 from a common center 447 located on the center line 19 in spaced relation from a center eye 71 (still to be described) in the direction away from the link module. The side surfaces 441 also include respective outer curved portions 449 which respectively extend from the outer ends 445 of the inner portions 443 and which are defined by respective radii 446 extending from the common point 447.

The first plurality of eyes 31 also includes a center eye 71 projecting along the center line 19 from the spine portion 51 in the same direction as the first and second series 65 and 67 of the first plurality of eyes 31 and includes an outer end or edge surface 77, and a pair of laterally spaced arcuate outwardly convex side portions or edge surfaces 79 which extend between the spine portion 51 and the outer end or edge surface 77.

In the fourth conveyor, or belt, or chain 411, the second plurality of eyes 41 includes a first series of eyes 85 which extends from the first spine side portion 53 in the direction opposite to the direction of extension of the first series 65 of the first plurality of eyes 31 and on the one side of the center line 19 and along the intended direction of conveyor travel. The first series of eyes 85 include an inner eye 461 located adjacent the center line 19, an outer eye 463 located adjacent the conveyor side 21, and one or more intermediate eyes 465 located intermediate the inner and outer eyes 461 and 463 and in spaced relation to one another and to the inner and outer eyes 461 and 463 to define therebetween the spaces 47.

The second plurality of eyes 41 of the conveyor or belt or chain 411 also includes a second series 87 of eyes which extend from the spine side portion 55 in the direction opposite to the direction of extension of the second series 67 of the first plurality of eyes 31 and on the other side of the center line 19 and along the direction of intended conveyor travel. The second series 87 of eyes include an inner eye 462 located adjacent the center line 19, an outer eye 464 located adjacent the conveyor side 23, and one or more intermediate eyes 466 located intermediate the inner and outer eyes 462 and 464 and in spaced relation to one another and to the inner and outer eyes 462 and 464 to define therebetween the spaces 47.

The inner eyes 461 and 462 of the first and second series 85 and 87 of the second plurality of eyes 41 of the fourth conveyor, belt, or chain 411 are generally of identical shape (except for being left and right handed) and respectively include outer end portions 471 defined by respective outer end or edge surfaces 473, and by side portions or edge surfaces 35 which arcuately respectively extend from the laterally spaced ends of the outer end or edge surfaces 471 toward the spine portion 51.

The inner eyes 461 and 462 of the first and second series 85 and 87 of the second plurality of eyes 41 of the fourth conveyor, belt, or chain 411 also respectively include neck portions 475 which extend between the spine portion 51 and the outer end portions 471, which taper toward the spine portion 51, and which, in general, are of lesser transverse width than the outer end portions 471.

The inner eyes 461 and 462 of the first and second series 85 and 87 of eyes of the second plurality of eyes 41 of the fourth conveyor, belt, or chain 411 define a center space 479 which is located along the center line 19 and which is bordered by the side portions or edge surfaces 461 and 462.

The outer eyes 463 and 464 of the first and second series 85 and 87 of the second plurality of eyes 41 of the fourth conveyor, belt, or chain 411 are generally of identical shape (except for being left and right handed) and respectively include outer end portions 481 defined by respective outer end or edge surfaces 483, and by arcuate side portions or surface edges 45 which respectively extend from the laterally spaced ends of the outer end or edge surfaces 483 toward the spine portion 51.

The outer eyes 463 and 464 of the first and second series 85 and 87 of the second plurality of eyes 41 of the fourth conveyor, belt, or chain 411 also respectively include neck portions 485 which extend between the spine portion 51 and the outer end portions 451, which taper toward the spine portion 51, and which, in general, are of lesser transverse width than the outer end portions 451.

The intermediate eyes 465 and 466 of the first and second series 85 and 87 of the second plurality of eyes 41 of the fourth conveyor, belt, or chain 411 are generally of identical shape (except for being left and right handed), and respectively include outer end portions 487 defined by respective arcuate outer end or edge surfaces 489 which extend for more than 180 degrees, and neck portions 491 which extend between the spine portion 51 and the outer end portions 487, which taper toward the spine portion 51, and which, in general, are of lesser transverse width than the outer end portions 487.

Respectively defined between the inner eyes 461 and 462 and the intermediate eyes 465 and 466, and between adjacent intermediate eyes 465 and 466, and between the intermediate eyes 465 and 466 and the outer eyes 463 and 464 of the first and second series 85 and 87 of eyes of the second plurality of eyes 41 are respective spaces 47 adapted to receive the first plurality of eyes of an another link module.

As in the first, second, and third conveyors 111, 211, and 311, in the conveyor or belt or chain 411, receipt of one of the chain pins 25 in the aligned bores 33 and 43 of the first and second plurality of eyes 31 and 41 prevents disengagement of the first and second plurality of eyes 31 and 41 from each other (and thereby disengagement of the link modules 27 and 29).

One or both of the first and second transversely aligned series of bores 33 and 43 is elongated in the direction of intended conveyor travel to accommodate side-flexing of the conveyer. While other constructions can be employed, in the conveyor 411, the bores 33 are of generally constant diameter, and the bores 43 are elongated or flared in the direction of conveyor travel to accommodate pivoting or side-flexing of the conveyor about the center line 19.

Any suitable arrangement can be employed to advance the fourth conveyor 411 along the associated given path. In the specifically disclosed construction, the underside of at least one of the first plurality of eyes 31 includes a driving recess including a surface 481 adapted to be engaged by the teeth of a driving sprocket (not shown).

As in the other embodiments, in the fourth conveyor, belt, or chain 411, the first plurality of eyes 31 of one of the link modules 27 and 29 are received in the plurality of spaces 47 defined by the second plurality of eyes 41 on the adjacent link module in such manner as to locate the eye side portions or edge surfaces 35 and 45 for abutting and interfering engagement in the direction of intended conveyor travel (and in position to prevent escape from such relation consequent to either forward or side-flexing movement in the plane of intended conveyor movement) so as thereby to transmit tension or load therebetween along the given path, i.e., in the direction of intended conveyor travel. Such tension or load is transmitted at several laterally spaced intervals or locations along the width of the conveyor or belt or chain 411, notwithstanding side-flexing (or straight forward movement), due to the interfering engagement in the direction of conveyor movement of the side portions of the first and second plurality of eyes 31 and 41 and independently of the receipt of the associated one of the chain pins 25 in the first and second plurality of eyes 31 and 41.

In addition, at least one eye of the first plurality of eyes 31 and one eye of the second plurality of eyes 41 are located for interfering engagement with each other in a direction transverse to the direction of intended conveyor movement so as to prevent substantial movement therebetween in the direction transverse to the direction of intended conveyor movement.

One of the advantages of the invention is that the disclosed chain, belt, or conveyor construction can be manufactured with greater width because the chain, belt, or conveyor transfers tension or load at multiple places transversely of the chain, belt, or conveyor and is not limited by pin strength.

Another particular and especially important advantage of the disclosed invention is that a single side-flexing conveyor, belt, or chain as disclosed herein can replace a multiple strand conveyor, belt, or chain.

Advantageously, the disclosed conveyor, belt, or chain (with the curved or inclined interfering side portions or edge surfaces) is not limited to load transfer at the sides of the chain, belt, or conveyor, and through the hinge pin, as referred to above. Because the eyes are curved or inclined and intermesh together, adjacent link modules mate together so as to carry the load or tension at multiple places throughout the width of the chain, belt, or conveyor during side-flex. In one of the embodiments, the curved eyes have incremental radii starting from a center on the center line to insure positive interaction during side-flexure. Furthermore, the link modules will not expand and contract in straight forward movement or running because the curved or inclined eyes interfere to keep the chain, belt, or conveyor running straight and at a constant pitch.

During side-flexure, the disclosed chain, belt, or conveyor can carry the load or tension in two forms. First, the curved or inclined eyes equally distribute the load across the remainder of the link modules to provide for an equally distributed load. In addition, if desired, the hinge pin can be placed in shear at an outer side of the link modules in a manner similar to previous designs.

In some embodiments, the load can be transferred from one link module to the next by transferring load through the side portions (as fully explained above) and also by transferring load from one link module to the connecting hinge pin and from the connecting hinge pin to the next link module.

The curved or inclined eye design provides a chain, belt, or conveyor which tracks better and which is stronger. Because the disclosed chains, belts, or conveyors involve equal loading across the width thereof, the disclosed chains, belts, or conveyors can carry heavier loads. In addition, the disclosed chains, belts, or conveyors perform better and track better because the they have a constant pitch.

Various of the features of the invention are set forth in the following claims.

We claim:

1. A conveyor intended for travel along an intended direction on a given path, having a center line and laterally spaced and opposed sides, and comprising a chain pin, a first link module including a first plurality of laterally spaced eyes which respectively have therein aligned first bores receiving said chain pin, and which define a series of spaces, and a second link module including a second plurality of laterally spaced eyes which respectively have therein aligned second bores receiving said chain pin to prevent disconnection of said first and second modules, and which are received in said spaces between said first plurality of eyes so as to engage said first plurality of eyes in such manner as to directly transmit tension in the direction of conveyor movement between said first and second link modules on each side of the center line and at least during side flexing movement along the given path.

2. A conveyor in accordance with claim 1 wherein said first plurality of laterally spaced eyes includes at least one eye provided with a first side portion, and wherein said second plurality of laterally spaced eyes includes at least one eye provided with a second side portion, and wherein said first and second said side portions are located for interfering engagement in the direction of intended conveyor travel so as to transmit therebetween tension in the direction of the intended conveyor travel.

3. A conveyor in accordance with claim 2 wherein said transmission of tension occurs independently of the receipt of said chain pin in said first and second plurality of eyes.

4. A conveyor in accordance with claim 2 wherein the receipt of said chain pin in said first and second plurality of eyes prevents disengagement of said first and second plurality of eyes from each other.

5. A conveyor in accordance with claim 2 wherein at least one of said first plurality of eyes and one of said second plurality of eyes are located for interfering engagement with each other in a direction transverse to the direction of intended conveyor movement so as to prevent substantial movement therebetween in the direction transverse to the direction of intended conveyor movement.

6. A conveyor in accordance with claim 2 wherein said given path has a center line, wherein said first plurality of eyes includes a first eye located in spaced relation to, and on one side of, said center line, and including said first side portion, wherein said second plurality of eyes includes a second eye located in spaced relation to, and on the other side of, said center line, and including said second side portion, wherein said first plurality of eyes also includes a third eye which is located in spaced relation to, and on the other side of, said center line and includes a third side portion, and wherein said second plurality of eyes also includes a fourth eye which is located in spaced relation to, and on the other side of, said center line and includes a fourth side portion located for interfering engagement with said third side portion in the direction of intended conveyor travel so as to transmit therebetween tension in the direction of the intended conveyor travel.

7. A conveyor in accordance with claim 2 wherein said first and second link modules are of one piece molded plastic construction and are generally identical.

8. A conveyor in accordance with claim 1 wherein said transmission of tension occurs independently of the receipt of said chain pin in said first and second plurality of eyes.

9. A conveyor intended for travel along an intended direction on a given path, having a center line and laterally spaced and opposed sides, and comprising a chain pin, a first link module including a first plurality of laterally spaced eyes which extend along the direction of the given path, which have respective spaced side portions, and which respectively have therein aligned first bores receiving said chain pin, and a second link module including a second plurality of laterally spaced eyes which are laterally offset from said first plurality of eyes, which extend in the direction opposite to the direction of extension of said first plurality of eyes, which have respective side portions, which define therebetween a plurality of spaces which receive said first plurality of eyes with said side portions of said first and second plurality of eyes in interfering engagement on each side of the center line for transmission therebetween of tension in the direction of the given path at least during side flexing movement along the given path, and which respectively have therein aligned second bores receiving said chain pin.

10. A conveyor in accordance with claim 9 wherein said first plurality of eyes are generally identically shaped, and wherein said plurality of spaces are generally identically shaped.

11. A conveyor in accordance with claim 9 wherein said first plurality of eyes and said plurality of spaces are generally circular in shape.

12. A conveyor in accordance with claim 11 wherein said first plurality of eyes are smaller in size than said plurality of spaces, and wherein said first plurality of eyes are loosely received in said plurality of spaces.

13. A conveyor in accordance with claim 9 wherein said side portions of said first plurality of eyes are outwardly convex, and wherein said side portions of said second plurality of eyes are outwardly concave.

14. A conveyor in accordance with claim 9 wherein said first and second pluralities of eyes also respectively include second side portions located in laterally spaced relation to said first mentioned side portions, and wherein said second side portions of said first plurality of eyes and said second side portions of said second plurality of eyes are in interfering engagement along the direction of the given path to transmit therebetween tension in the direction of the given path.

15. A conveyor in accordance with claim 9 wherein one of said first and second bores is elongated in the direction of intended conveyor travel.

16. A conveyor in accordance with claim 9 wherein said conveyor includes a central axis extending in the intended direction of the given path, and wherein said first and second link modules respectively include laterally extending spine portions which respectively interconnect said first and second eyes, and which extend laterally in both directions from said central axis.

17. A conveyor in accordance with claim 9 wherein said spine portions extend in inclined relation to said central axis.

18. A conveyor in accordance with claim 9 wherein said conveyor includes a central axis extending in the direction of the given path, and wherein said first plurality of eyes includes a center eye projecting along said central axis and including laterally spaced side portions, wherein said second plurality of eyes includes a first series of eyes located on one side of said central axis and including an eye located adjacent said central axis and having a side portion which is located adjacent said central axis, and which engages one of said side portions of said center eye, and a second series of eyes on the other side of said central axis and including an eye located adjacent said central axis and having a side portion which is located adjacent said central axis, and which engages one of said side portions of said center eye.

19. A conveyor in accordance with claim 18 wherein said side portions of said center eye are outwardly convex, and wherein said side portions of said eyes located adjacent said center line are outwardly concave.

20. A conveyor in accordance with claim 18 wherein said second link module includes a spine portion interconnecting said second plurality of eyes and extending laterally in both directions from said central axis, wherein said bores in said second plurality of eyes include a margin adjacent to said spine portion, and wherein said side portions of said second series of eyes include curved portions respectively extending at radii which extend from a common point on said center line, and inner portions which extend in inwardly inclined relation to said center line from said curved portions and toward said spine portion, and wherein said straight and curved portions join one another at said inner bore margin.

21. A conveyor in accordance with claim 18 wherein said conveyor includes a central axis extending in the direction of the given path, and wherein said first plurality of eyes have outer ends located in lateral alignment and include a first series of eyes located on one side of said central axis and including a first eye located adjacent said central axis, a second eye remote from said central axis, and a third eye located intermediate said first and second eyes, and a second series of eyes on the other side of said central axis and including a fourth eye located adjacent said central axis, a fifth eye remote from said central axis, and a sixth eye located intermediate said fourth and fifth eyes.

22. A conveyor in accordance with claim 21 wherein said adjacent eyes and said remote eyes are of the same size, and wherein said intermediate eyes are of lesser size than said size of said adjacent and said remote eyes and have outer semi-circular end portions.

23. A conveyor in accordance with claim 21 wherein said aligned bores in said first series of eyes are elongated along the direction of the given path, and wherein said elongation increases with increasing distance from said central axis and in both directions from a line extending perpendicularly to said central axis.

24. A conveyor intended for travel along an intended direction on a given path, having a center line and laterally spaced and opposed sides, and comprising a chain pin, a first link module including a first plurality of laterally spaced eyes which extend along the direction of intended conveyor travel, and which respectively include aligned first bores receiving said chain pin, a first eye spaced from said center line at one side thereof and including a first surface extending transversely to the direction of intended conveyor travel, and a second eye spaced from said center line on the other side thereof and including a second surface extending transversely to the direction of intended conveyor travel, and a second link module including a second plurality of laterally spaced eyes which are laterally offset from said first plurality of eyes, which extend in the direction opposite to the direction of extension of said first plurality of eyes, which define therebetween a plurality of spaces which receive said first plurality of eyes, and which include aligned second bores receiving said chain pin, a third eye spaced from said center line at said one side thereof and including a third surface extending transversely to the direction of intended conveyor travel and in abutting engagement in the direction of intended conveyor travel with said first surface for transmission therebetween of tension in the direction of intended conveyor travel, and a fourth eye spaced from said center line on said other side thereof and including a fourth surface extending transversely to the direction of intended conveyor travel and in abutting engagement in the direction of intended conveyor travel with said second surface for transmission therebetween of tension in the direction of intended conveyor travel on each side of the center line and at least during side flexing movement along the given path.

25. A conveyor intended for travel along a given path, having laterally spaced and opposed sides, and including side-flexing capability, said conveyor comprising a chain pin, a first link module including a first center line extending in the direction of intended conveyor travel, a first spine portion which extends laterally in both directions from said first center line, and a first plurality of laterally spaced eyes which extend from said first spine portion in respective arcs respectively defined by first radii extending from a first common center located on said first center line and respectively including arcuately extending side portions, and which respectively have therein aligned first bores receiving said chain pin, and a second link module including a second center line extending in the direction of intended conveyor travel, a second spine portion which extends laterally in both directions from said second center line, and a second plurality of laterally spaced eyes which are laterally offset from said first plurality of eyes, which extend from said second spine portion in the direction opposite to the direction of extension of said first plurality of eyes, which respectively extend in arcs respectively defined by second radii extending from a second common center located on said second center line, which respectively include arcuately extending side portions, which define therebetween a plurality of arcuately extending spaces loosely receiving said first plurality of eyes with said side portions of said first and second plurality of eyes in interfering engagement in the direction of the given path for transmission therebetween of tension in the direction of the given path on each side of the center line and at least during side flexing movement along the given path, and which respectively have therein aligned second bores receiving said chain pin.

26. A conveyor in accordance with claim 25 wherein said first radii progressively increase in length with increased spacing of said first eyes from said first common point, and wherein said second radii progressively increase in length with increased spacing of said second eyes from said second common point.

27. A conveyor in accordance with claim 26 wherein said plurality of arcuately extending spaces respectively include radially extending widths, and wherein said first plurality of laterally spaced eyes respectively include radially extending widths which are of lesser extent than said radially extending widths of said plurality of spaces.

28. A conveyor in accordance with claim 25 wherein said widths of said first plurality of laterally spaced eyes are equal, and wherein said widths of said plurality of arcuately extending spaces are equal.

29. A conveyor in accordance with claim 25 wherein said first plurality of laterally spaced eyes includes a middle eye located along said center line, being of truncated circular shape with a given diameter, and having arcuate side portions spaced at said given diameter, and wherein said second plurality of eyes includes a pair of eyes which are located adjacent said center line, which include side portions defining a circular space with a given diameter greater than said given diameter of said middle eye and having an entry opening with a width less than said given diameter of said middle eye, and which loosely receive said middle eye.

30. A conveyor in accordance with claim 29 wherein said first common center is located centrally in said middle eye, wherein said second common center is located centrally in said circular space, wherein said first bores include an axis intersecting said first common center, and wherein said second bores include an axis intersecting said second common center.

31. A conveyor in accordance with claim 25 wherein said first and second centers coincide.

32. A conveyor intended for travel along an intended direction on a given path, having laterally spaced and opposed sides, and comprising a chain pin, a first link module including a first laterally extending spine portion, and a first plurality of laterally spaced eyes which extend from said first spine portion along the direction of the given path, which are of generally circular shape with a first transverse dimension and include respective spaced side portions, and which respectively have therein aligned first bores receiving said chain pin, and a second link module including a second laterally extending spine portion, and a second plurality of laterally spaced eyes which are laterally offset from said first plurality of eyes, which extend from said second spine portion in the direction opposite to the direction of extension of said first plurality of eyes, which include respective side portions, which define therebetween a plurality of spaces of generally circular shape having a transverse dimension greater than said first dimension, and loosely receiving said first plurality of eyes with said side portions of said first and second plurality of eyes in interfering engagement in the direction of the given path for transmission therebetween of tension in the direction of the given path on each side of the center line and at least during side flexing movement along the given path, and which respectively have therein aligned second bores receiving said chain pin.

33. A conveyor intended for travel along a given path, and having a center line extending in the direction of intended conveyor travel and laterally spaced and opposed sides, said conveyor comprising a chain pin, a first link module including a first plurality of laterally spaced eyes including respective aligned first bores receiving said chain pin, and a first eye located on one side of said center line, extending in inclined relation to said center line, and including a first edge surface, and a second link module including a second plurality of laterally spaced eyes which are laterally offset from said first plurality of eyes, which define therebetween a plurality of spaces loosely receiving said first plurality of eyes, and which include respective aligned second bores receiving said chain pin, and a second eye located on said one side of said center line, extending in inclined relation to said center line and in generally parallel relation to said first eye, and including a second edge surface located for interfering engagement with said first edge surface in the direction of intended conveyor movement so as to transmit therebetween tension in the direction of intended conveyor movement on each side of the center line and at least during side flexing movement along the given path.

34. A conveyor in accordance with claim 33 wherein the receipt of said chain pin in said first and second plurality of eyes prevents disengagement of said first and second plurality of eyes from each other.

35. A conveyor in accordance with claim 33 wherein at least one of said first plurality of eyes and one of said second plurality of eyes are located for interfering engagement with each other in a direction transverse to the direction of intended conveyor movement so as to prevent substantial movement therebetween in the direction transverse to the direction of intended conveyor movement.

36. A conveyor in accordance with claim 33 wherein said first plurality of eyes also includes a third eye located on the other side of said center line, extending in inclined relation to said center line and in opposing relation to the inclined extension of said first eye, and including a third edge surface, and wherein said second plurality of eyes also includes a fourth eye located on the other side of said center line, extending in inclined relation to said center line and in generally parallel relation to said third eye, and including a fourth edge surface.

37. A conveyor in accordance with claim 36 wherein said first, second, third, and fourth edges include respective outer ends, wherein said outer end of said first edge is located from said center line at a first distance, wherein said outer end of said second edge is located from said center line at a second distance less than said first distance, wherein said outer end of said third edge is located from said center line at a third distance, and wherein said outer end of said fourth edge is located from said center line at a fourth distance less than said third distance.

38. A conveyor intended for travel along a given path, having a center line and laterally spaced and opposed sides, and comprising a chain pin, a first link module including a first spine portion which extends laterally in both directions from said first center line, and a first plurality of laterally spaced eyes which extend from said first spine portion along the direction of intended conveyor travel, which respectively include aligned first bores receiving said chain pin, and arcuate side portions defined by radii extending from a common center located on said center line, and a second link module including a second spine portion which extends laterally in both directions from said second center line, and a second plurality of laterally spaced eyes which are laterally offset from said first plurality of eyes, which extend from said second spine portion in the direction opposite to the direction of extension of said first plurality of eyes, which respectively include aligned second bores receiving said chain pin, and arcuate side portions, and which define therebetween a plurality of spaces extending in inclined relation to said second center line and loosely receiving said first plurality of eyes with said arcuate side portions of said first and second plurality of eyes in interfering engagement in the direction of the given path for transmission therebetween of tension in the direction of the given path on each side of the center line and at least during side flexing movement along the given path.

39. A conveyor in accordance with claim 38 wherein said plurality of spaces include lateral widths which increase with increased spacing of said spaces from said center line.

40. A conveyor in accordance with claim 38 wherein said second plurality of laterally spaced eyes also include straight parallel side portions which extend between said spine portions and said arcuate side portions, and which include outer ends adjacent said arcuate side portions, and wherein said second bores include margins which are relatively adjacent said spine potions and which intersect said outer ends of said parallel side portions.

41. A conveyor intended for travel along a given path, and having a center line extending in the direction of intended conveyor travel and laterally spaced and opposed sides, said conveyor comprising a chain pin, a first link module including a first spine portion which extends laterally in both directions from said center line, and a first plurality of laterally spaced eyes which project from said first spine portion along the direction of intended conveyor travel, which respectively have laterally spaced sides defining therebetween a first plurality of spaces, and which respectively have therein bores aligned in perpendicular relation to said center line, and which receive said chain pin, and a second link module including a second spine portion which extends laterally in both directions from said center line, and a second plurality of laterally spaced eyes which are laterally offset from said first plurality of eyes, which project from said second spine portion in the direction opposite to the direction of extension of said first plurality of eyes, which have respective side portions defining therebetween a second plurality of spaces receiving said first plurality of eyes with said arcuate side portions of said first and second plurality of eyes in interfering engagement on each side of said center line for transmission therebetween of tension in the direction of the given path at least during side flexing movement along the given path, and which respectively have therein aligned bores receiving said chain pin.

42. A conveyor in accordance with claim 41 wherein said second plurality of eyes includes a center eye projecting along said center line and having laterally spaced side portions converging in the direction of the projection of said second plurality of eyes, wherein said first plurality of eyes includes a first series of eyes located on one side of said center line and including an eye located adjacent said center line and including a side portion adjacent said center line and projecting in generally parallel relation to one of said side portions of said center eye, a second series of eyes on the other side of said center line and including an eye located adjacent said center line and including a side portion adjacent said center line and projecting in generally parallel relation to the other of said side portions of said center eye, and wherein said second plurality of spaces includes a center space located along said center line and defined by said side portions of said eyes located adjacent said center line.

43. A conveyor in accordance with claim 42 wherein said side portions of said first plurality of laterally spaced eyes extend, on both sides of said center line, in the direction of the projection of said first plurality of eyes and in inclined relation toward said center line, and wherein said side portions of said second plurality of laterally spaced eyes extend, on both sides of said center line, in the direction of the projection of said first plurality of eyes and in inclined relation from said center line.

44. A conveyor in accordance with claim 42 wherein said first and second bores are elongated in the direction of intended conveyor travel.

45. A conveyor in accordance with claim 42 wherein said first spine portion also extends in the direction opposite from the direction of intended conveyor travel.

46. A conveyor in accordance with claim 42 wherein said second plurality of laterally spaced eyes which respectively include laterally spaced arcuate sides which respectively are defined by radii of progressively increasing length in accordance with increased spacing of said second eyes from said second center line, and which respectively include lateral widths which are of progressively increasing length in accordance with increased spacing of said second eyes from said second center line, and which are greater than said lateral widths of said entry openings, and wherein said slots are laterally aligned and have respective lengths extending in the direction of intended conveyor travel for progressively increasing distances with increased spacing of said second eyes from said second center line.

47. A conveyor in accordance with claim 41 wherein said first plurality of laterally spaced eyes respectively includes necks having lateral widths adjacent said first spine portion, trailing ends aligned in perpendicular relation to said first center line, and main portions which are located between said necks and said trailing ends, which have lateral widths greater than said lateral widths of said necks, and which respectively include laterally spaced arcuate sides which respectively include one of said side portions, and which are respectively defined by radii which extend from a common point located on said center line at a given distance ahead of said first spine portion, and which progressively increase in length in accordance with increased lateral spacing of said arcuate sides from said center line.

* * * * *